(12) United States Patent
Lindner et al.

(10) Patent No.: US 6,348,430 B1
(45) Date of Patent: *Feb. 19, 2002

(54) EXHAUST GAS TREATMENT CATALYST FOR INTERNAL COMBUSTION ENGINES WITH TWO CATALYTICALLY ACTIVE LAYERS ON A CARRIER STRUCTURE

(75) Inventors: Dieter Lindner, Hanau; Renee Van Yperen, Vecht; Lothar Mussmann, Offenbach; Egbert Lox, Hanau; Thomas Kreuzer, Karben, all of (DE)

(73) Assignee: Degussa AG, Hanau (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/100,251

(22) Filed: Jun. 19, 1998

Related U.S. Application Data

(60) Provisional application No. 60/053,217, filed on Jul. 18, 1997.

(30) Foreign Application Priority Data

Jun. 20, 1997 (DE) .......................... 197 26 322

(51) Int. Cl.[7] .............................. B01J 21/06; B01J 23/38
(52) U.S. Cl. ..................... 502/304; 502/325; 502/326; 502/328; 502/349; 502/514; 502/527.12
(58) Field of Search .................. 502/304, 325, 502/326, 328, 514, 527.12, 349; 423/213.5

(56) References Cited

U.S. PATENT DOCUMENTS

| | | | |
|---|---|---|---|
| 5,057,483 A | 10/1991 | Wan | 502/304 |
| 5,063,192 A | 11/1991 | Murakami et al. | 502/303 |
| 5,130,109 A * | 7/1992 | Wan | 423/213.5 |
| 5,196,390 A * | 3/1993 | Tauster et al. | 502/251 |
| 5,556,825 A * | 9/1996 | Shelef et al. | 502/303 |
| 5,677,258 A * | 10/1997 | Kurokawa et al. | 502/303 |
| 5,702,675 A * | 12/1997 | Takeshima et al. | 423/213.5 |
| 5,753,580 A * | 5/1998 | Hayashi et al. | 502/304 |
| 5,849,660 A * | 12/1998 | Takemoto et al. | 502/327 |
| 5,958,828 A * | 9/1999 | Murakami et al. | 502/333 |
| 5,981,427 A * | 11/1999 | Sung et al. | 502/325 |

FOREIGN PATENT DOCUMENTS

| | | |
|---|---|---|
| DE | 4021570 A1 | 1/1991 |
| DE | 19606822 A1 | 8/1996 |
| DE | 19617123 A1 | 10/1996 |
| EP | 0335847 A1 | 10/1989 |
| EP | 0443765 A1 | 8/1991 |
| EP | 0771584 A1 | 5/1997 |
| WO | WO9309146 | 5/1993 |
| WO | WO9500235 | 1/1995 |
| WO | 95/35152 A | 12/1995 |
| WO | WO95/35152 | 12/1995 |
| WO | WO9640417 | 12/1996 |
| WO | WO9743035 | 11/1997 |

\* cited by examiner

Primary Examiner—Steven P. Griffin
Assistant Examiner—Timothy C. Vanoy
(74) Attorney, Agent, or Firm—Smith, Gambrell & Russell LLP

(57) ABSTRACT

A catalyst for treating the exhaust gas from internal combustion engines is provided, wherein the catalyst contains two catalytically active layers supported on a support. The first catalytically active layer contains a platinum group metal in close contact with all of the constituents of the first catalytically active layer, wherein the constituents of the first catalytically active layer include particulate aluminum oxide; particulate oxygen storage material, such as cerium oxide, cerium/zirconium and zirconium/cerium mixed oxides, and alkaline earth metal oxides. The second catalytically active layer, which is in direct contact with the exhaust gas, contains particulate aluminum oxide and at least one particulate oxygen storage material, such as cerium oxide, cerium/zirconium and zirconium/cerium mixed oxides. Rhodium is supported on part of the aluminum oxides in the second catalytically active layer or on the particulate oxygen storage material in the second catalytically active layer. By providing the platinum group metal in close contact with all of the constituents of the first catalytically active layer, improved conversion efficiency of the impurities in the exhaust gas can be achieved.

43 Claims, No Drawings

EXHAUST GAS TREATMENT CATALYST FOR INTERNAL COMBUSTION ENGINES WITH TWO CATALYTICALLY ACTIVE LAYERS ON A CARRIER STRUCTURE

REFERENCE TO A RELATED APPLICATION

The present application is a continuation-in-part of our copending U.S. provisional application No. 60/053,217 of Jul. 18, 1997, which is relied on and incorporated herein by reference.

INTRODUCTION AND BACKGROUND

The present invention relates to an exhaust gas treatment catalyst for internal combustion engines with two catalytically active layers on a carrier structure.

Combustion engines emit, as the main pollutants in the exhaust gas, carbon monoxide CO, unburnt hydrocarbons HC and nitrogen oxides $NO_x$, a high percentage of which are converted into the harmless components water, carbon dioxide and nitrogen by modern exhaust gas treatment catalysts. Conversion takes place under substantially stoichiometric conditions, that is the oxygen contained in the exhaust gas is controlled using a so-called lambda sensor in such a way that the oxidation of carbon monoxide and hydrocarbons and the reduction of nitrogen oxides to nitrogen can take place almost quantitatively. The catalysts developed for this purpose are called three-way catalytic converters.

Stoichiometric conditions prevail when the normalized air/fuel ratio $\lambda$ is 1. The normalized air/fuel ratio $\lambda$ is the air/fuel ratio standardized to stoichiometric conditions. The air/fuel ratio states how many kilograms of air are required for complete combustion of one kilogram of fuel. In the case of conventional gasoline engine fuels, the stoichiometric air/fuel ratio has a value of 14.6. The engine exhaust gas has more or less large, periodic variations in normalized air/fuel ratio depending on the load and the engine speed. To produce better conversion of oxidizable hazardous components under these conditions, oxygen-storing components such as, for example, pure cerium oxide or cerium oxide-containing components are used which bind oxygen when it is present in excess and release it again when there is a deficiency of oxygen in the exhaust gas.

The present invention deals with catalyst coatings on inert, monolithic carrier structures, in particular honeycomb structures with parallel flow channels for the exhaust gas. The number of flow channels per cross-sectional area is called the cell density. Inert carrier structures with cell densities between 10 and 250 $cm^{-2}$ are used, depending on the requirements of the application. These may be extruded, ceramic carrier structures made from cordierite, mullite or similar, temperature resistant materials. Alternatively, honeycomb structures made from steel sheeting may be used.

In the context of the present invention, a layer is called catalytically active when it is able to at least partly catalyze the conversion, mentioned above, of hazardous substances contained in the exhaust gas from combustion engines to give harmless components. Included among the harmful substances are in particular carbon monoxide, nitrogen oxides and hydrocarbons, wherein the hydrocarbons also include hydrocarbons present in the condensed form on soot particles in the exhaust gas.

The catalytic coating generally contains, as catalytically active components, several noble metals from the platinum group in the Periodic Table of Elements and high surface area materials and other components such as oxygen-storing materials, promoters and stabilizers. The coating is applied to the internal walls of the flow channels by known coating processes using an aqueous coating dispersion which contains the various components in the catalyst.

The catalyst components may be added to the coating dispersion in a variety of forms:

a) as "finely divided solids"

This is understood to mean powdered materials with particle sizes from 1 to about 50 $\mu$m. In the English language literature, the expressions "bulk material" or "particulate material" are used for these.

b) as "colloidal solids"

These have particle sizes of less than 1 $\mu$m. The particulate structure of finely divided and colloidal solids is retained even in the final catalyst coating.

c) in the form of soluble "precursor compounds"

Precursor compounds are generally deposited as high surface area solids and converted into the actual catalysis-promoting components by thermal treatment in an oxidative or reductive atmosphere and are then present in a highly dispersed form with crystallite sizes of generally less than 10 nm. At extremely high concentration or in the case of very low solubility, precursor substances may also be present in between the finely divided solids and have particle sizes similar to those of the latter.

The finely divided solids in the coating dispersion serve in part as support materials for the highly disperse materials resulting from the precursor compounds. The finely divided solids must have a high specific surface area for this purpose. Materials with high surface areas in the context of this invention are those with a specific surface area, also called the BET surface area, of more than 10 $m^2/g$. The specific surface area can be measured using nitrogen absorption isotherms in accordance with DIN 66132.

Examples of solids with high surface areas are the so-called active aluminum oxides. These are finely divided aluminum oxides which have the crystal structure of transition phases of aluminum oxide. Chi, delta, gamma, kappa, theta and eta-aluminum oxide being included here.

Active aluminum oxides have specific surface areas of up to 400 $m^2/g$. With increasing temperature, the crystal structures mentioned above are interconverted with a simultaneous reduction in the specific surface area (see Ullmann's Encyclopedia of Industrial Chemistry; 5th edition 1985; vol. A1; pages 557–563). Above 1150° C., only low surface area alpha-aluminum oxide is stable. This process can be slowed down by stabilizing with alkaline earth metal oxides, in particular barium oxide, rare earth oxides, preferably lanthanum oxide, or silicon dioxide. Stabilized, active aluminum oxides usually contain 1 to 10 wt. % of barium oxide, lanthanum oxide or silicon dioxide, with reference to the total weight of stabilized material, for this purpose.

To differentiate high surface area support materials from the inert, monolithic carrier for the coating, the latter is called a carrier structure in the context of this invention, the high surface area support materials, on the other hand, being called supports or support materials.

Pure cerium oxide or mixed oxides of cerium and zirconium are frequently used as oxygen-storing materials. Mixed oxides are obtainable, for example, by coprecipitation of precursor compounds of the two elements. Cerium-rich mixed oxides with more than 50 wt. % of cerium and zirconium-rich mixed oxides with more than 50 wt. % of zirconium are known. Cerium-rich mixed oxides are called cerium/zirconium mixed oxides and zirconium-rich mixed oxides are called zirconium/cerium mixed oxides in the following description.

EP 0 314 057 B1 describes a rhodium-free, three-way catalytic converter which has two catalytically active layers on a carrier structure, wherein the first layer applied to the carrier structure contains platinum and the second, upper layer contains palladium. Active aluminum oxide is used as support material for these components in both cases. The layers also contain cerium oxide which is introduced by means of a cerium salt and/or a solid cerium compound. The layers may also contain zirconium oxide, lanthanum oxide, neodymium oxide, praseodymium oxide and nickel oxide, as separate substances or in a mixture. The noble metals are introduced to the layers by impregnation. In a similar way, EP 0 314 058 B1 describes a platinum-free three-way catalytic converter which consists of two catalytically active layers on a carrier structure. The first layer contains palladium and the second layer contains rhodium. In this case again, active aluminum oxide is used as the support material. Both layers also contain cerium oxide and optionally the same promoters and stabilizers as those in accordance with EP 0 314 057 B1.

U.S. Pat. No. 5,057,483 also describes a catalyst composition comprising two discrete layers on a monolithic carrier structure. The first layer contains a stabilized aluminum oxide as support material for platinum and finely divided cerium oxide. The first layer may also contain finely divided iron oxide and nickel oxide to suppress the emission of hydrogen sulphide as well as highly dispersed barium oxide and zirconium oxide, distributed throughout the entire layer, as thermal stabilizers. The second layer contains a coprecipitated cerium/zirconium mixed oxide onto which is deposited rhodium as well as an activated aluminum oxide as a support material for platinum. The coprecipitated zirconium/cerium mixed oxide preferably contains 2 to 30 wt. % of cerium oxide.

Another two-layered three-way catalytic converter is disclosed in WO 95/35152. It contains, in the first layer, a first support material and a first platinum component and optionally a first platinum group component, optionally at least a first stabilizer, optionally at least a first rare earth metal component and optionally a zirconium component. The second layer contains a second support material, a second platinum component, a rhodium component, a second oxygen-storing component in dilute form and optionally a zirconium component.

EP 0 734 757 A1 discloses a catalytic converter with the three platinum group metals platinum, palladium and rhodium. The catalyst consists of two layers on a carrier structure. According to the EP document, it was found that the degrees of conversion of the harmful substances are improved if palladium is located in the inner layer and platinum and rhodium are located in the outer layer. In addition, the degrees of conversion are improved if the weights of the two layers (inner layer to outer layer) are in the ratio 3:1 to 1.25:1.

Future legal exhaust gas limits are subject to increasing stringency. The currently valid limits and those proposed for the future, e.g. by the EU, for individual hazardous substances are given in Table 1. The limits must be complied with when performing the MVEG-A driving cycle with cold-start, acceleration and part-load modes of operation.

TABLE 1

Current and proposed future limits for hazardous substance emissions

| Pollutant | Limits*) [g/km] | | |
|---|---|---|---|
|  | 1996/97 | 2000/01 | 2005/06 |
| CO | 2.7 | 2.3 | 1.0 |
| HC + NO$_x$ | 0.5 |  |  |
| HC |  | 0.2 | 0.1 |
| NO$_x$ |  | 0.15 | 0.08 |

*)These values must be complied with when performing the MVEG-A driving cycle

In accordance with Table 1, it is planned to reduce the limits for carbon monoxide, hydrocarbons and nitrogen oxide to about one third of the 1996 limits by the year 2005. This type of improvement is only possible if the catalytic activity of currently known catalysts can be increased still further. This is possible, given the high catalytic activity already achieved, only by careful selection and mutual adjustment of the catalyst components.

Also, increasing the heat resistance of catalytic activity is particularly important because a substantial proportion of the emissions during the MVEG-A driving cycle are emitted in the cold-start phase, during the first 120 seconds after starting the engine. To reduce cold-start emissions, start catalysts and main catalysts are installed near the engine, these being heated to their light-off temperatures very rapidly by the hot exhaust gases, but also being subjected to peak temperatures of up to 1050° C. at the entrance to the catalyst during the normal driving phase.

An object of the present invention is, therefore, to provide a catalyst which has a higher activity and heat resistance than known catalysts.

A further object of the invention is to achieve a higher activity and heat resistant catalyst with the smallest possible amount of noble metals, that is in the most cost-effective manner possible.

SUMMARY OF THE INVENTION

The above and other objects are achieved by an exhaust gas treatment catalyst with two catalytically active layers on a carrier structure, the first layer applied to the carrier structure containing several finely divided solids, one or more highly dispersed alkaline earth metal oxides and at least one platinum group metal, wherein the finely divided solids consist of at least one finely divided oxygen-storing material and at least one other finely divided component and the platinum group metals are in close contact with all the constituents in the first layer.

Platinum group metals form the actual catalytically active components in the catalyst according to the invention. Included in the platinum group metals are platinum, palladium, rhodium, osmium and iridium. They are present in the catalyst in a highly dispersed form with particle sizes of generally less than 10 nm. The expression "platinum group metals" and reference to individual platinum group metals themselves, in the context of the present invention, covers all catalytically active forms of these metals. These include, in addition to the metallic state, also higher oxidation states of these metals. Palladium and optionally platinum are preferably used in the first layer of the catalyst.

The second catalytically active layer in the catalyst, which comes into direct contact with the exhaust gas, may be structured differently, in accordance with the catalytic function required. To produce a good three-way catalytic converter, a useful layer structure for the second layer has proved to be one which, like the first layer, also contains several finely divided solids and at least one platinum group metal, wherein the finely divided solids in this second layer comprise at least one finely divided oxygen-storing material and at least one other finely divided component and only a portion of these finely divided solids in the second layer is used as support for the platinum group metals in the second layer.

In the context of this invention, "finely divided components" and "finely divided oxygen-storing materials" are differentiated. Both of these are finely divided solids. Differently from the oxygen-storing materials, finely divided components have no substantial oxygen-storing capacity. Both the finely divided components and the finely divided oxygen-storing materials are sometimes also used as support materials in the catalyst. The finely divided components may be oxides of alkaline earth metals, oxides of scandium, yttrium, gallium, indium, silicon, titanium, zirconium, hafnium, germanium, tin, lead, vanadium, niobium, tantalum, chromium, molybdenum and tungsten. Carbides, borides, silicides and nitrides of the transition metals may also be used. Oxides are preferably used, however, in particular active aluminum oxides. Furthermore, mixed oxides such as aluminosilicates and titanates (barium or aluminum titanate) and zeolites may be used as finely divided components.

A feature of the present invention resides in the method of the aforementioned catalysts.

DETAILED DESCRIPTION OF THE INVENTION

In accordance with current understanding of the invention, the heat resistance of the total coating is substantially increased by the stated arrangement of constituents with respect to each other in the first layer. The arrangement is wherein the platinum group metals in the first layer are in close contact with all the constituents in this layer, that is with both all the finely divided solids in the layer and also with all portions of the highly dispersed materials. In order to achieve this, special measures must be taken during preparation of the first layer, these being described in more detail in the following.

The heat and ageing resistance of the total coating is further improved by depositing the platinum group metal in the second layer on only a portion of the finely divided components. The uncoated portion can then act as an adsorber for catalyst poisons. For this purpose, the ratio by weight of solids used as supports for platinum group metals to the rest of the solids in the second layer should be between 1:10 and 5:1, preferably between 1:4 and 1:1. The most expedient ratio by weight depends on the structure and composition of both layers in the catalyst and on the average composition of the exhaust gas. With increasing dilution (decreasing ratio by weight) of support particles coated with platinum group metals in the second layer, contact of the exhaust gas diffusing through the second layer with these catalytically active centers becomes poorer. Ratios by weight of less than 1:10 are therefore generally no longer advisable. In contrast, with increasing ratios by weight, the amount of platinum metal-free solids available for adsorbing catalyst poisons decreases. The ratio by weight should therefore be kept to a value of less than 5:1.

Advantageous embodiments of the catalyst according to the invention are described herein below.

In a specific embodiment of the invention, a high surface area cerium oxide is used as a finely divided oxygen-storing material in the first layer and a cerium-rich cerium/zirconium mixed oxide is used in the second layer. Aluminum oxide is used as a finely divided component in both layers. Palladium and optionally platinum are used as platinum group metals in the first layer, while rhodium and optionally platinum are used in the second layer. A portion of the active aluminum oxide in the second layer is used as support for rhodium and optionally platinum.

One or more highly dispersed alkaline earth metal oxides such as, for example, magnesium oxide, barium oxide and calcium oxide are used in the first layer of the catalyst, for stabilizing purposes. However, barium oxide is preferably used as the only alkaline earth metal oxide in all embodiments of the invention.

To ensure a high heat resistance for the catalytic activity of the rhodium and optionally present platinum, it is advantageous, at least for that part of the aluminum oxide which is used as support for rhodium and optionally platinum, to use a stabilized aluminum oxide. The remainder of the aluminum oxide may also be stabilized. To stabilize the aluminum oxide, any known stabilizing components may be used. Aluminum oxide stabilized with lanthanum oxide is preferably used.

A further advantageous embodiment of the catalyst provides, as compared with the preceding embodiment, that a finely divided cerium/zirconium mixed oxide is used in the first layer instead of the high surface area cerium oxide and that cerium oxide and zirconium oxide in highly dispersed form are also present in the first layer in addition to the highly dispersed alkaline earth metal oxides. As in the preceding embodiment, palladium and optionally platinum are used as platinum group metals in the first layer and rhodium and optionally platinum are used in the second layer. Rhodium and optionally platinum are deposited on only a portion of the aluminum oxide in the second layer, as was the case in the preceding embodiment. Here again, to increase the heat resistance of the catalyst, it is advisable to stabilize at least the portion of active aluminum oxide in the second layer which is used as a support for rhodium and optionally platinum. The active aluminum oxide in the first layer may also be stabilized. Barium oxide is used as the only alkaline earth metal oxide.

As an alternative to the embodiment just described, the cerium/zirconium mixed oxide may be used as a support for rhodium and optionally platinum instead of a portion of the active aluminum oxide in the second layer.

A further increase in the heat resistance of the catalyst is produced if the cerium/zirconium mixed oxide in one or both catalyst layers is stabilized against thermal strain with 0.1 to 10 wt. % of praseodymium oxide in accordance with patent application DE 197 14 707.0, which is not a prior publication and is relied on and incorporated herein by reference. As an alternative, the cerium/zirconium mixed oxide may be used as support material for rhodium and optionally platinum instead of the active aluminum oxide in the second layer. In this case, stabilizing the cerium/zirconium mixed oxide with praseodymium oxide is particularly advantageous.

The finely divided oxygen-storing material used in embodiments of the catalyst according to the invention dealt with so far is either pure cerium oxide or a cerium-rich cerium/zirconium mixed oxide with a cerium oxide concentration of 60 to 90, preferably 70 wt. %, with reference to the total weight of mixed oxide. These materials are commercially available. They have a specific surface area between 60 and 200 $m^2/g$ which is relatively stable to changes in temperature. As an alternative, or in addition to these, finely divided, zirconium-rich zirconium/cerium mixed oxides with a cerium oxide concentration of 10 to 30, preferably 20 wt. %, with reference to the total weight of mixed oxide, may be used. The preparation and use of this type of material is described, for example, in U.S. Pat. No. 5,057,483 which was cited above.

These last-mentioned, zirconium-rich mixed oxides are more stable to changes in temperature than cerium-rich mixed oxides but they have a smaller storage capacity for oxygen. This defect may be compensated for by using them in larger amounts.

A disadvantage of cerium-rich and of zirconium-rich mixed oxides is the fact that the cerium oxide inside the mixed oxides is only available for oxygen storage to a limited extent. Better availability of the cerium oxide for oxygen storage is offered by a material in accordance with patent application DE 197 14 707.0, which is not a prior publication. This is a powdered zirconium oxide. Cerium oxide is applied to the surface of the powder particles. This means that all the cerium oxide in the material is available for oxygen storage.

Further advantageous embodiments of the catalyst provide the incorporation of finely divided nickel oxide in the first and optionally the second layer, to suppress hydrogen sulphide emissions.

The first layer of the catalyst is applied to the carrier structure at a concentration of 100 to 300 g/l of carrier structure volume, whereas concentrations of 40 to 150 g/l of carrier structure volume are provided for the second layer. The following concentration ranges have proven advantageous for the individual components in the layers: the finely divided components in the first layer represent the major component in the layer and are used in concentrations of 60 to 150 g/l. The finely divided oxygen-storing materials are each incorporated into the coating at 20 to 100 g/l of carrier structure volume. Amounts of 10 to 40 g/l of alkaline earth metal oxide are sufficient to stabilize the coating. Concentrations of 10 to 70 g/l of each of the optionally also present highly dispersed materials cerium oxide and zirconium oxide have proved to be useful.

The second layer is substantially thinner than the first layer. Only about 25 to 75, preferably 30 to 50%, of the amount of coating in the first layer is applied to the carrier structure. The finely divided oxygen-storing components in the second layer are each used in concentrations of 5 to 70 g/l.

The platinum group metals in the first layer are incorporated into the layer at a concentration of 0.1 to 5 wt. %, with reference to the total weight of the first layer. This corresponds to a concentration of up to 15 g/l with reference to the carrier structure volume. The platinum group metals in the second layer are used at concentrations of 0.1 to 10, preferably 0.1 to 5 wt. %, with reference to the relevant support material. It has been shown that the catalyst according to the invention, with the same or lower concentrations of noble metals as are present in commercially obtainable catalysts, have better or at least equivalent catalytic activity.

The ratio by weight of platinum group metals to each other may be varied over relatively wide ranges. When using platinum, palladium and rhodium, ratios by weight of platinum to rhodium of 3:1 to 1:3 have proved useful. A ratio by weight of approximately 1:1, however, is preferably used. Palladium is used in substantially larger amounts. The mass ratio of palladium to platinum is preferably in the range between 10:1 and 20:1. If platinum is present in the catalyst it is preferably used only as an alternative in the two layers: either together with palladium in the first layer or together with rhodium in the second layer. If there is no platinum in the catalyst, then ratios by weight of palladium to rhodium between 10:1 and 1:2 can be used. A ratio by weight of less than 5:1 is preferably used, this enabling good catalytic activity for the conversion of all three types of hazardous substances.

An essential feature of the catalyst according to the invention is the fact that the platinum group metal (palladium and optionally platinum), the alkaline earth metal oxides and optionally cerium oxide and zirconium oxide in highly dispersed form are deposited onto the finely divided components and onto the finely divided oxygen-storing materials in the first layer. This greatly increases the catalytic activity and stability of the catalyst.

Depositing the highly dispersed solids onto the finely divided solids may be achieved in a variety of ways. There is the possibility of first preparing an aqueous coating dispersion of the finely divided solids and coating a catalyst carrier structure with this. After drying and calcining the coating, it is impregnated with an aqueous solution of precursor compounds of the platinum group metals and the alkaline earth metal oxides and then dried and calcined again. As an alternative to this procedure, the precursor compounds of the platinum group metals and alkaline earth metal oxides are added to the aqueous coating dispersion of finely divided solids. Another possibility comprises adding only precursor compounds of the alkaline earth metal oxides to the coating dispersion, coating the carrier structure and only then impregnating the coating with precursor compounds of the noble metals.

When also using highly dispersed cerium oxide and zirconium oxide in the first layer, these oxides are applied to the finely divided solids in the first layer in a preceding process. Here, the precursor compounds of cerium oxide and zirconium oxide and of the alkaline earth metal oxides are dissolved in water. The finely divided solids (finely divided components and oxygen-storing compounds) are dispersed in this solution. The dispersion is then dewatered, dried and precalcined. The precalcined powder is used, as described above, for preparing the first catalytically active layer.

The preceding description comprises only one possible process stage for preparing the first layer of the catalyst. Other, different combinations of impregnation steps, adsorption steps and precalcination are also possible for preparing the layer. It is important that the process selected ensures that in the final layer the platinum group metals are in close contact with all the constituents of the layer. For this purpose, the precursor compounds of the platinum group metals have to be incorporated into the coating dispersion or into the layer already deposited on the carrier structure, alone or together with remaining precursor compounds of the other highly dispersed components, in a final working stage.

An essential feature of the second layer is that rhodium and optionally platinum are only deposited on a portion of the finely divided constituents of the second layer. This may be a portion of the total amount of aluminum oxide intended for the second layer or one of the oxygen-storing solids. This ensures that there is always an adequate amount of noble metal-free aluminum oxide present in the second layer as a trap for poisons. In order to achieve this, the amount of finely divided solid intended for use as support material for rhodium and optionally platinum is separately impregnated with the noble metals, dried and precalcined, before the coating dispersion for the second layer is prepared with the powder obtained in this way and the remaining finely divided solids. The intermediate drying and precalcining procedures may be omitted if an aqueous dispersion is first prepared, using the amount of finely divided solids intended to be used as support material, to which is added a solution of the precursor compounds of the noble metals. The remaining finely divided solids required to complete preparation of the coating dispersion are added only after a waiting time of at least 30 minutes, during which time the precursor compounds are adsorbed onto the support material. A prerequisite for this cost-effective variant for preparing the coating dispersion is that the precursor compounds of the noble metals selected can be readily adsorbed by the support material. Nitrates of the noble metals are particularly suitable for this purpose.

Apart from this restriction, any conventional precursor compounds of platinum group metals may be used to prepare the catalyst according to the invention. Acetates and nitrates are preferred as precursor compounds for the alkaline earth metal oxide, cerium oxide and zirconium oxide.

The drying and calcining steps mentioned above are performed in air at temperatures of 120 to 180° C. (drying) and at temperatures between 250 and 500° C. (calcining). The calcining temperatures must ensure decomposition of the precursor compounds and their conversion into the actual catalysis promoting components. In the case of barium, cerium and zirconium, these are barium oxide, cerium oxide and zirconium oxide in highly dispersed form. The platinum group metals are present partly in metallic form and partly in higher oxidation states after calcination.

During operation, the catalysts are heated to temperatures of up to 1050° C. Conversion of the precursor compounds into the actual catalysis promoting components may therefore be left until a forming phase during start-up in a motor vehicle. The drying and calcining steps required during production of the catalyst have the object only of fixing the particular coating to the carrier structure before the next process step and converting water-soluble compounds into insoluble compounds. Thus, all or some of the calcining steps may optionally be omitted.

In the following, some embodiments of the catalyst according to the invention are compared with a catalyst in accordance with WO 95/35152. The following raw materials were used to make the catalysts:

La/Al$_2$O$_3$:
 γ-aluminum oxide, stabilized with 2 to 4 wt. % of lanthanum, calculated as lanthanum oxide;
 BET surface area: 140 m$^2$/g;
γ-Al$_2$—O$_3$:
 pure gamma-aluminum oxide;
 BET surface area: 140 m$^2$/g
 initial particle size: d$_{50}$≈15 μm;
CeO$_2$:
 pure, high surface area cerium oxide;
 BET surface area: 100 m$^2$/g
 initial particle size: d$_{50}$≈10 μm;
CeO$_2$/ZrO$_2$:
 coprecipitated cerium/zirconium mixed oxide;
 concentration of cerium oxide: 70 wt. %;
 BET surface area: 60 m$^2$/g;
 initial particle size: d$_{50}$≈30 μm
ZrO$_2$/CeO$_2$:
 coprecipitated zirconium/cerium mixed oxide;
 concentration of zirconium oxide: 80 wt. %;
 BET surface area: 50 m$^2$/g;
 initial particle size: d$_{50}$≈3 μm;
CeO$_2$/ZrO$_2$/Pr$_6$O$_{11}$:
 highly dispersed Pr$_6$O$_{11}$ on cerium/zirconium mixed oxide with 67 wt. % of cerium oxide, 28 wt. % of zirconium oxide and 5 wt. % of praseodymium oxide;
 BET surface area: 60 m$^2$/g;
 initial particle size: d$_{50}$≈17 μm;
Ce(C$_2$H$_3$O$_2$)$_3$:
 cerium acetate;
ZrO(C$_2$H$_3$O$_2$)$_2$:
 zirconyl acetate;
Ba(C$_2$H$_3$O$_2$)$_2$:
 barium acetate;

NiO:
 nickel oxide;
 BET surface area: 20 m$^2$/g;
 initial particle size: d$_{50}$≈14 μm;
catalyst carrier structure:
 cordierite; 62 cells/cm$^2$
 volume: 1.67 l;
 dimensions: 118.4 mmø, 152.4 mm length The thermal stability of the catalytic activity of the catalyst is substantially affected by the relative arrangement of the constituents with respect to each other in the first layer. This factual finding was checked in preliminary tests. For this, catalyst carrier structures were each coated with only the first layer of the catalyst. Only palladium was used as a platinum group metal, this being introduced in different relative arrangements with respect to the remaining constituents of the layer. The remaining constituents included stabilized aluminum oxide, cerium/zirconium mixed oxide, nickel oxide and highly dispersed cerium oxide, zirconium oxide and barium oxide.

In preliminary test 1, the arrangement in accordance with the invention was selected, that is palladium was in close contact with all the remaining constituents in the layer. In preliminary test 2, palladium was deposited only on aluminum oxide and in preliminary test 3, half the palladium was deposited on aluminum oxide and half on the cerium/zirconium mixed oxide.

Preliminary Test 1

An aqueous coating dispersion which contained, with reference to aluminum oxide, an additional 30 wt. % of cerium/zirconium mixed oxide, 30 wt. % of cerium oxide as cerium acetate, 30 wt. % of zirconium oxide as zirconyl acetate, 20 wt. % of barium oxide as barium acetate and 4.3 wt. % of nickel oxide, was made up. The coating dispersion was carefully homogenized by milling. The final coating dispersion had a solids content of 34 wt. % and the average particle size of the finely divided solids was about 2 to 4 μm.

The carrier structure was coated by immersing once in this coating dispersion, dried for 0.5 hours in air at 120° C. and calcined for a period of 4 hours at 500° C. Afterwards, the coating was impregnated by immersing the carrier structure in an aqueous solution of palladium nitrate and then dried and calcined again. After the drying and calcining procedure, the concentration of coating on the carrier structure was about 218 g/l and it had the following composition:

| | |
|---|---|
| La/Al$_2$O$_3$ | 100 g/l |
| CeO$_2$/ZrO$_2$ | 30 g/l |
| CeO ex acetate | 30 g/l |
| ZrO$_2$ ex acetate | 30 g/l |
| BaO ex acetate | 20 g/l |
| NiO | 4.3 g/l |
| Pd | 3.8 g/l |

The relative arrangement of the constituents with respect to each other can be represented as follows:

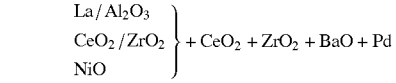

Preliminary Test 2

Differently from preliminary test 1, palladium was fixed on the stabilized aluminum oxide before making up the coating dispersion. In this case, the required amount of aluminum oxide was impregnated with an aqueous solution of palladium nitrate using the method of pore volume impregnation. The final coating had the same composition as that in preliminary test 1. The relative arrangement of the constituents with respect to each other can be represented as follows:

of catalyst from preliminary test 1, has distinct advantages as compared with the arrangements in preliminary tests 2 and 3.

TABLE 2

Engine test of catalysts from preliminary test 1 (PT1), preliminary test 2 (PT2) and preliminary test 3 (PT3) after engine ageing at 1000° C. for a period of 4 hours; Exhaust gas temperature 400° C.; exhaust gas modulation: 1.0 Hz ± 0.5 A/F (air/fuel ratio)

| Prel. test | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| | CO% | HC% | $NO_x$% | CO% | HC% | $NO_x$% | CO% | HC% | $NO_x$% | CO% | HC% | $NO_x$% | CO% | HC% | $NO_x$% |
| PT1 | 58.8 | 89.6 | 72.9 | 62.5 | 90.2 | 66.6 | 63.4 | 90.5 | 63.2 | 65.4 | 90.6 | 57.7 | 67.9 | 90.5 | 55.9 |
| PT2 | 44.7 | 87.9 | 62.4 | 47.7 | 88.5 | 57.6 | 50.2 | 88.4 | 56.4 | 51.8 | 88.8 | 53.8 | 54.0 | 88.7 | 52.3 |
| PT3 | 27.5 | 77.9 | 44.9 | 29.8 | 78.8 | 41.7 | 31.5 | 78.6 | 41.4 | 32.2 | 79.8 | 39.9 | 32.8 | 80.3 | 39.7 |

TABLE 3

Engine test of catalysts from preliminary test 1 (PT1), preliminary test 2 (PT2) and preliminary test 3 (PT3) after engine ageing at 1000° C. for a period of 4 hours; Exhaust gas temperature 400° C.; exhaust gas modulation: 1.0 Hz ± 1.0 A/F (air/fuel ratio)

| Prel. test | $\lambda = 0.993$ | | | $\lambda = 0.996$ | | | $\lambda = 0.999$ | | | $\lambda = 1.002$ | | | $\lambda = 1.006$ | | |
|---|---|---|---|---|---|---|---|---|---|---|---|---|---|---|---|
| | CO% | HC% | $NO_x$% | CO% | HC% | $NO_x$% | CO% | HC% | $NO_x$% | CO% | HC% | $NO_x$% | CO% | HC% | $NO_x$% |
| PT1 | 63.1 | 88.4 | 77.3 | 68.4 | 88.5 | 77.3 | 85.3 | 91.3 | 73.9 | 91.7 | 91.4 | 62.8 | 93.7 | 91.4 | 57.7 |
| PT2 | 61.9 | 88.5 | 74.5 | 67.0 | 88.6 | 71.7 | 75.7 | 89.6 | 67.0 | 81.6 | 89.7 | 60.0 | 86.3 | 90.1 | 55.4 |
| PT3 | 36.7 | 66.3 | 34.8 | 36.2 | 67.1 | 36.1 | 52.3 | 81.8 | 46.1 | 57.7 | 83.7 | 44.9 | 63.9 | 85.7 | 43.4 |

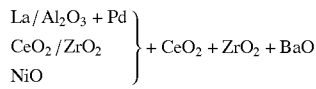

Preliminary Test 3

Differently from preliminary test 1 and preliminary test 2, half of the palladium was pre-fixed on the cerium/zirconium mixed oxide and half was pre-fixed on the aluminum oxide. The final coating had the same composition as that in preliminary test 1. The relative arrangement of the constituents can be represented as follows:

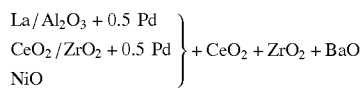

Preliminary Test 4

The rates of conversion of the catalysts in the three preliminary tests 1 to 3 for hazardous substances CO, HC and $NO_x$ were tested by ageing in a 1.8 l gasoline engine. Ageing was performed at a bed temperature (temperature of the catalyst) of 1000° C. for a period of 40 hours. The rates of conversion were measured on an engine test stand at a bed temperature of 400° C. with different normalized air/fuel ratios λ. To simulate real conditions, the normalized air/fuel ratio was modulated at a frequency of 1 Hz and amplitudes of ±0.5 A/F (air/fuel ratio) and ±1.0 A/F. The results of the measurements are given in Tables 2 and 3 below. The experimental values given in the Tables are average values from at least two measurements. They show that the arrangement of constituents according to the invention, in the layer

COMPARISON EXAMPLE

A catalyst was prepared on a honeycomb structure with the dimensions given above precisely in accordance with the data given in the examples in WO 95/35152. The final catalyst contained the following amounts of coating:

| 1st layer | |
|---|---|
| $Al_2O_3$: | 61.02 g/l |
| $NdO_2$: | 6.10 g/l |
| $La_2O_3$: | 4.58 g/l |
| $ZrO_2$: | 3.05 g/l |
| SrO: | 15.26 g/l |
| $ZrO_2/CeO_2$: | 30.51 g/l |
| Pd: | 3.25 g/l |
| Pt: | 0.07 g/l |

In accordance for the instructions in WO 95/35152, palladium was deposited only on aluminum oxide and platinum only on the zirconium/cerium mixed oxide with a cerium content of 20 wt. %. The relative arrangement of the constituents in the layer can be represented as follows:

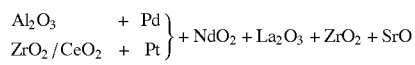

| 2nd layer | |
|---|---|
| $ZrO_2/CeO_2$: | 73.23 g/l |
| $Al_2O_3$: | 30.51 g/l |

-continued

| 2nd layer | |
|---|---|
| $ZrO_2$: | 4.58 g/l |
| Rh: | 0.26 g/l |

In the second layer, rhodium and platinum were deposited together onto only the same zirconium/cerium mixed oxide which was used in the first layer. The relative arrangement of constituents in this layer can be represented as follows:

$$\left.\begin{array}{l} Al_2O_3 \\ ZrO_2/CeO_2 + Rh + Pt \end{array}\right\} + ZrO_2$$

The total noble metal content in the coating was:

Pt+Pd+Rh=3.76 g/l with Pt: 0.25 g/l; Pd: 3.25 g/l; Rh: 0.26 g/l
The ratio by weight of platinum group metals with respect to each other was thus Pt:Pd:Rh=1:13:1.04.

EXAMPLE 1

A catalyst was prepared wherein barium oxide is present in the first layer as the only alkaline earth metal oxide on the same honeycomb structure as in the comparison example. To apply the first layer, an aqueous coating dispersion of aluminum oxide and cerium oxide (ratio by weight $Al_2O_3:CeO_2=3:2$) with a solids content of 55 wt. % and a density of 1.65 kg/l was prepared. The dispersion was homogenized in a mill until the average particle size of the solids was about 2–3 μm.

The honeycomb structure was coated by immersion in this dispersion. The coating was dried for 1 hour at 120° C. and then calcined for a period of 2 hours at 250° C. Then the coating was impregnated with a solution containing both palladium nitrate and barium acetate and then dried and calcined again. The final first layer contained the following amounts of coating material:

| $Al_2O_3$: | 120 g/l |
|---|---|
| $CeO_2$: | 80 g/l |
| BaO: | 15 g/l |
| Pd: | 1.18 g/l |

The relative arrangement of the constituents in this layer can be represented as follows:

$$\left.\begin{array}{l} Al_2O_3 \\ CeO_2 \end{array}\right\} + BaO + Pd$$

To prepare the coating dispersion for the second layer, an aluminum oxide stabilized with lanthanum oxide was coated with 2.4 wt. %, with respect to the aluminum oxide used, of rhodium. For this, the stabilized aluminum oxide was dispersed in water. A solution of rhodium nitrate was added to this dispersion. After a sorption time of 30 minutes, a cerium/zirconium mixed oxide and pure aluminum oxide were added to the dispersion. The amounts of stabilized aluminum oxide, mixed oxide and pure aluminum oxide were present in the following ratio:

$La/Al_2O_3:CeO_2/ZrO_2:Al_2O_3=1:2:2$

The honeycomb structure was coated with this coating dispersion for a second time and then dried and calcined. The second layer contained the following amounts of coating materials:

| $La/Al_2O_3$: | 10 g/l |
|---|---|
| $CeO_2/ZrO_2$: | 20 g/l |
| $Al_2O_3$ | 20 g/l |
| Rh: | 0.24 g/l |

The relative arrangement of constituents in this layer can be represented as follows:

$La/Al_2O_3$ + Rh $CeO_2/ZrO_2$ $Al_2O_3$

The total noble metal content of the coating was

Pd+Rh=1.42 g/l with Pd: 1.18 g/l and Rh: 0.24 g/l and a ratio by weight of Pd:Rh=5:1.

EXAMPLES 2–4

In the same way as described in example 1, further catalysts were prepared with different amounts of noble metal:

| Example 2: | Pd + Rh = 1.98 g/l Pd: Rh = 3:2 |
|---|---|
| Example 3: | Pd + Rh = 2.37 g/l Pd: Rh = 1:1 |
| Example 4: | Pd + Rh = 2.93 g/l Pd: Rh = 2:3 |

EXAMPLE 5

A catalyst was prepared wherein barium oxide is present in the first layer as the only alkaline earth metal oxide and the active alumium oxide in the first layer is stabilized.

To make the first layer, an aqueous solution of cerium acetate and zirconium acetate was first made up. Stabilized aluminum oxide was dispersed in this solution. Then a solution of barium acetate was added. Finally a cerium/zirconium mixed oxide was dispersed in this dispersion. The dispersion was dewatered, dried and calcined at 500° C. for a period of 2 hours.

Afterwards, the powder obtained was dispersed again and homogenized in a mill until the finely divided material had a uniform particle size of 2–3 μm. A solution of palladium nitrate was added to this solution. Then a honeycomb structure was coated by immersion in this dispersion, dried and calcined for 2 hours at 300° C. The final layer contained the following amounts of coating materials:

| $La/Al_2O_3$: | 100 g/l |
|---|---|
| $CeO_2/ZrO_2$: | 30 g/l |
| $CeO_2$: | 30 g/l |
| $ZrO_2$: | 30 g/l |

-continued

| | |
|---|---|
| BaO: | 20 g/l |
| Pd: | 2.51 g/l |

The relative arrangement of the constituents can be represented as follows:

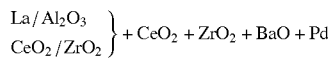

$$\left.\begin{array}{l} \text{La}/\text{Al}_2\text{O}_3 \\ \text{CeO}_2/\text{ZrO}_2 \end{array}\right\} + \text{CeO}_2 + \text{ZrO}_2 + \text{BaO} + \text{Pd}$$

To prepare the second layer, the procedure in example 1 was used. Instead of pure rhodium nitrate, a mixture of rhodium nitrate and platinum nitrate with a ratio by weight of rhodium to platinum of 1:1 was used. The second layer contained the following amounts of coating materials after being prepared:

| | |
|---|---|
| La/Al$_2$O$_3$: | 10 g/l |
| CeO$_2$/ZrO$_2$: | 20 g/l |
| Al$_2$O$_3$: | 20 g/l |
| Rh: | 0.16 g/l |
| Pt: | 0.16 g/l |

The relative arrangement of the constituents can be represented as follows:

| | |
|---|---|
| La/Al$_2$O$_3$ | + Rh + Pt |
| CeO$_2$/ZrO$_2$ | |
| Al$_2$O$_3$ | |

The total noble metal content of the coating was:

Pt+Pd+Rh=2.83 g/l with Pt:Pd:Rh=1:16:1

Application Example 1

The catalysts from the comparison example and from examples 1 to 4 were first aged with an 850° C. exhaust gas temperature at the entrance to the catalyst and for a period of 160 hours using a 1.8 l petrol engine. Then the hazardous substance conversion was determined via the MVEG-A driving cycle. The results are given in Table 4. The crude emissions from the engine without removing pollutants from the exhaust gas, using the driving cycle mentioned above, were: CO: 7.29 g/km; HC: 1.17 g/km; NO$_x$: 2.88 g/km

TABLE 4

Hazardous substance conversions measured

| Catalyst | Pt/Pd/Rh ratio | Loading [g/l] | Cost [%] | Emissions [g/km] CO | HC | NO$_x$ |
|---|---|---|---|---|---|---|
| CE | 1/14/1 | 3.76 | 100 | 1.10 | 0.19 | 0.31 |
| E1 | 0/5/1 | 1.42 | 40 | 1.42 | 0.23 | 0.45 |
| E2 | 0/3/2 | 1.98 | 65 | 1.16 | 0.20 | 0.31 |
| E3 | 0/1/1 | 2.37 | 85 | 1.05 | 0.17 | 0.25 |
| E4 | 0/2/3 | 2.93 | 110 | 0.92 | 0.15 | 0.22 |

CE: comparison example; E1: example 1

Table 4 gives, in addition to the ratio of noble metals present in the catalysts, their noble metal loading and the costs at the time of the patent application for the noble metals, with reference to the catalyst in the comparison example, taken as 100.

Table 4 shows that the catalyst according to the invention has the same hazardous substance conversions as the comparison catalyst at only 65% of the noble metal cost. Again, for only 85% of the noble metal cost of the comparison catalyst, the catalyst according to the invention provides much better performance data.

Application Example 2

The hazardous substance conversions of the catalysts from the comparison example and from example 5 were measured after different ageing procedures on a synthesis gas unit, under the following test conditions:

| | |
|---|---|
| bed temperature: | 400° C. |
| space velocity: | 50,000 h$^{-1}$ |
| normalized air/fuel ratios: | $\lambda_1 = 0.998$ |
| | $\lambda_2 = 1.000$ |
| | $\lambda_3 = 1.002$ |

The measurements were taken at three different normalized air/fuel ratios $\lambda_1$, $\lambda_2$ and $\lambda_3$. The normalized air/fuel ratios were modulated using a frequency of 1 Hz and an amplitude of ±0.8 A/F during the measurements.

Two sets of catalysts were available for the measurements, one set being aged for a period of 7 hours at a temperature of 950° C. in air and the other at 1050° C. in air.

The results of the measurements are given in Tables 5 and 6.

TABLE 5

Hazardous substance conversions after ageing for a period of 7 hours at 950° C.

| | $\lambda = 0.998$ | | | $\lambda = 1.000$ | | | $\lambda = 1.002$ | | |
|---|---|---|---|---|---|---|---|---|---|
| Cat. | CO [%] | HC [%] | NO$_x$ [%] | CO [%] | HC [%] | NO$_x$ [%] | CO [%] | HC [%] | NO$_x$ [%] |
| CE | 97 | 100 | 98 | 99 | 99 | 96 | 100 | 97 | 91 |
| E1 | 95 | 99 | 98 | 97 | 99 | 97 | 99 | 99 | 94 |

TABLE 6

Hazardous substance conversions after ageing for a period of 7 hours at 1050° C.

| | $\lambda = 0.998$ | | | $\lambda = 1.000$ | | | $\lambda = 1.002$ | | |
|---|---|---|---|---|---|---|---|---|---|
| Cat. | CO [%] | HC [%] | NO$_x$ [%] | CO [%] | HC [%] | NO$_x$ [%] | CO [%] | HC [%] | NO$_x$ [%] |
| CE | 78 | 92 | 86 | 81 | 92 | 84 | 84 | 91 | 83 |
| E1 | 89 | 95 | 96 | 94 | 95 | 93 | 95 | 94 | 87 |

As shown in the two Tables, the hazardous substance conversions for both catalysts are comparable after ageing at 950° C. After more intense ageing at 1050° C., the hazardous substance conversion of the comparison catalyst, however, is below that of the catalyst according to the invention. The better ageing stability here is achieved by using substantially smaller amounts of noble metal.

Further variations and modifications of the foregoing will be apparent to those skilled in the art and are intended to be encompassed by the claims appended hereto.

German priority application 197 26 322.4 is relied on an incorporated herein.

We claim:

1. An exhaust gas treatment catalyst for internal combustion engines comprising palladium and rhodium and two catalytically active layers on a carrier structure, wherein a first layer on said carrier structure comprises particulate aluminum oxide, optionally stabilized, and at least one particulate oxygen storage material selected from the group consisting of cerium oxide, cerium/zirconium and zirconium/cerium mixed oxides, and the first layer further comprises at least one highly dispersed alkaline earth metal oxide and palladium;

and a second layer, which is in direct contact with the exhaust gas, and comprises particulate aluminum oxide and at least one particulate oxygen storage material selected from the group consisting of cerium oxide, cerium/zirconium and zirconium/cerium mixed oxides, and wherein rhodium is supported on either of said at least one oxygen storage material of the second layer or on part of said aluminum oxide of the second layer while palladium in said first layer is in close contact with all constituents of the first layer.

2. The exhaust gas treatment catalyst as claimed in claim 1, wherein the highly dispersed alkaline earth metal oxide is barium oxide.

3. The exhaust gas treatment catalyst as claimed in claim 2, wherein the second layer further comprises platinum which is deposited onto the same particulate material as rhodium.

4. The exhaust gas treatment catalyst as claimed in claim 3, wherein rhodium is supported on part of the aluminum oxide of the second layer.

5. The exhaust gas treatment catalyst as claimed in claim 4, wherein said part of the aluminum oxide of the second layer forming the support for rhodium is stabilized.

6. The exhaust gas treatment catalyst as claimed in claim 1, wherein the first layer further comprises platinum in close contact with all constituents of this layer.

7. The exhaust gas treatment catalyst as claimed in claim 6, wherein rhodium is supported on part of the aluminum oxide of the second layer.

8. The exhaust gas treatment catalyst as claimed in claim 7, wherein said part of the aluminum oxide of the second layer forming the support for rhodium is stabilized.

9. The exhaust gas treatment catalyst as claimed in claim 8, wherein the first layer further contains highly dispersed cerium oxide and highly dispersed zirconium oxide.

10. The exhaust gas treatment catalyst as claimed in claim 9, wherein the particulate oxygen storage material of the first and second layer is a cerium/zirconium mixed oxide.

11. The exhaust gas treatment catalyst as claimed in claim 10, wherein said cerium/zirconium mixed oxide is stabilized by praseodymium oxide.

12. The exhaust gas treatment catalyst as claimed in claim 11, wherein in the second layer, the ratio by weight of the support material for rhodium and optionally platinum to the remaining amount of particulate materials in the second layer is from 1:10 to 5:1.

13. The exhaust gas treatment catalyst as claimed in claim 12, wherein the first and optionally the second layer further comprise particulate nickel oxide.

14. The exhaust gas treatment catalyst as claimed in claim 13, wherein the carrier structure onto which the layers are applied is an inert honeycomb structure made of ceramic or metal and wherein the first layer is applied to the carrier structure at a concentration of 100 to 300 grams per liter and the second layer is applied at a concentration of 40 to 150 grams per liter of carrier structure volume.

15. The exhaust gas treatment catalyst as claimed in claim 14, wherein the first layer contains 60 to 150 grams per liter of said particulate aluminum oxide, 20 to 100 grams per liter of each of said particulate oxygen storage materials and 10 to 40 grams per liter of said alkaline earth metal oxide of the first layer and the second layer contains 5 to 100 grams per liter of said particulate aluminum oxide and 5 to 70 grams per liter of each of said particulate oxygen storage materials of the second layer.

16. The exhaust gas treatment catalyst as claimed in claim 1, wherein the first layer further contains 10 to 70 grams per liter of highly dispersed cerium oxide and zirconium oxide.

17. The exhaust gas treatment catalyst as claimed in claim 16, wherein the first layer contains palladium and optionally platinum at a concentration of 0.1 to 5 wt. % with reference to the total weight of the first layer and the second layer contains rhodium and optionally platinum at a concentration of 0.1 to 10 wt. % with reference to the support material for rhodium and optionally platinum.

18. Process for preparing an exhaust gas treatment catalyst as claimed in claim 1, which comprises:

a) preparing an aqueous coating dispersion intended for said first layer by dispersing said particulate aluminum oxide and said at least one particulate oxygen storage material into water;

b) coating said carrier structure with said dispersion to form a coated carrier and drying and calcining said coated carrier, thereby forming said first layer;

c) impregnating said first layer with an aqueous solution of precursor compounds of said alkaline earth metal oxide and of palladium and drying and calcining the first layer;

d) preparing an aqueous coating dispersion intended for said second layer by dispersing the support material for rhodium and optionally platinum into water;

e) adding an aqueous solution of precursor compounds of rhodium and optionally platinum to the aqueous dispersion from step d);

f) after a soaking time of at least 30 minutes, completing the coating dispersion for the second layer by dispersing remaining particulate materials for the second layer into the aqueous dispersion from step e);

g) coating the support structure already provided with the first layer with the coating dispersion from step f) and drying and calcining.

19. Process for preparing an exhaust gas treatment catalyst as claimed in claim 18, wherein the amount of coating of the second layer applied to the catalyst is from about 25 percent to about 75 percent of the amount of coating of the first layer applied to the catalyst.

20. Process for preparing an exhaust gas treatment catalyst as claimed in claim 1, which comprises:

a) preparing an aqueous coating dispersion intended for said first layer by dispersing said particulate aluminum oxide and said at least one particulate oxygen storage material into water and adding an aqueous solution of precursor compounds of the alkaline earth metal oxide;

b) coating the support structure with said dispersion to form a coated carrier, and drying and calcining said coated carrier, thereby forming said first layer;

c) impregnating said first layer with an aqueous solution of precursor compounds of palladium and drying and calcining the first layer;

d) preparing an aqueous coating dispersion intended for said second layer by dispersing the support material for rhodium and optionally platinum into water;

e) adding an aqueous solution of precursor compounds of rhodium and optionally platinum to the aqueous dispersion from step d);

f) after a soaking time of at least 30 minutes, completing the coating dispersion for the second layer by dispersing remaining particulate materials for the second layer into the aqueous dispersion from step e);

g) coating the support structure already provided with the first layer with the coating dispersion from step f) and drying and calcining.

21. Process according to claim 20, wherein a solution of precursor compounds of cerium oxide and zirconium oxide is further added to the dispersion of step a).

22. Process for preparing an exhaust gas treatment catalyst as claimed in claim 20, wherein the amount of coating of the second layer applied to the catalyst is from about 25 percent to about 75 percent of the amount of coating of the first layer applied to the catalyst.

23. Process for preparing an exhaust gas treatment catalyst as claimed in claim 1, which comprises:

a) preparing an aqueous coating dispersion intended for said first layer by dispersing said particulate aluminum oxide and said at least one particulate oxygen storage material into water and adding an aqueous solution of precursor compounds of said alkaline earth metal oxide and of palladium;

b) coating the carrier structure with said dispersion to form a coated carrier, and drying and calcining said coated carrier, thereby forming said first layer;

c) preparing an aqueous coating dispersion intended for said second layer by dispersing the support material for rhodium and optionally platinum into water;

d) adding an aqueous solution of precursor compounds of rhodium and optionally platinum to the aqueous dispersion from step c);

e) after a soaking time of at least 30 minutes, completing the coating dispersion for the second layer by dispersing remaining particulate materials for the second layer into the aqueous dispersion from step d);

f) coating the support structure already provided with the first layer with the coating dispersion from step e) and drying and calcining.

24. Process according to claim 23, wherein a solution of precursor compounds of cerium oxide and zirconium oxide is further added to the dispersion of step a).

25. Process for preparing an exhaust gas treatment catalyst as claimed in claim 23, wherein the amount of coating of the second layer applied to the catalyst is from about 25 percent to about 75 percent of the amount of coating of the first layer applied to the catalyst.

26. Process for preparing an exhaust gas treatment catalyst as claimed in claim 1, which comprises:

a) impregnating said particulate aluminum oxide and said at least one particulate oxygen storage material intended for said first layer with precursor compounds of cerium oxide, zirconium oxide and said alkaline earth metal oxide and then drying and calcining;

b) preparing an aqueous coating dispersion intended for the first layer by dispersing the impregnated materials from step a) into water;

c) coating the carrier structure with said dispersion to form a coated carrier, and drying and calcining said coated carrier, thereby forming said first layer;

d) impregnating said first layer with an aqueous solution of precursor compounds of palladium and drying and calcining the first layer;

e) preparing an aqueous coating dispersion intended for said second layer by dispersing the support material for rhodium and optionally platinum into water;

f) adding an aqueous solution of precursor compounds of rhodium and optionally platinum to the aqueous dispersion from step e);

g) after a soaking time of at least 30 minutes, completing the coating dispersion for the second layer by dispersing remaining particulate materials for the second layer into the aqueous dispersion from step f);

h) coating the support structure already provided with the first layer with the coating dispersion from step g) and drying and calcining.

27. Process for preparing an exhaust gas treatment catalyst as claimed in claim 26, wherein the amount of coating of the second layer applied to the catalyst is from about 25 percent to about 75 percent of the amount of coating of the first layer applied to the catalyst.

28. An exhaust gas treatment catalyst for an internal combustion engine, made by a process comprising:

a) preparing a first aqueous coating dispersion intended for a first layer by dispersing into water a particulate aluminum oxide, optionally stabilized, and at least one particulate oxygen storage material selected from the group consisting of cerium oxide, cerium/zirconium mixed oxides and zirconium/cerium mixed oxides;

b) coating a carrier structure with the first aqueous coating dispersion to form a coated carrier, followed by drying and calcining the coated carrier, thereby forming the first layer;

c) impregnating the first layer with an aqueous solution of at least one precursor compound of at least one alkaline earth metal oxide and of palladium, and drying and calcining the first layer, so that the palladium in the first layer is in close contact with all constituents of the first layer;

d) preparing a second aqueous coating dispersion intended for a second layer by dispersing into water a member selected from the group consisting of:
   only a portion of a particulate aluminum oxide intended for the second layer, and
   a particulate oxygen storage material intended for the second layer, the particulate oxygen storage material intended for the second layer being selected from the group consisting of cerium oxide, cerium/zirconium mixed oxides, zirconium/cerium mixed oxides, and mixtures thereof;

e) adding to the second aqueous coating dispersion an aqueous solution of at least one precursor compound of rhodium, and optionally of platinum;

f) after a soaking time of at least 30 minutes, completing the coating dispersion for the second layer by dispersing into the second aqueous dispersion from step e) either (i) all of the particulate aluminum oxide intended for the second layer, if the particulate oxygen storage material was dispersed into the water during step d), or (ii) the remaining portion of the particulate aluminum oxide intended for the second layer, and the particulate oxygen storage material, if only a portion of the particulate aluminum oxide intended for the second layer was not added in step d); and, g) coating the support structure having the first layer thereon with the second aqueous coating dispersion from step f), followed by drying and calcining, such that the second layer comprises the particulate aluminum oxide, the particulate oxygen storage material, the rhodium, and optionally the platinum.

29. The process according to claim 28, wherein the resulting alkaline earth metal oxide of the first layer comprises barium oxide.

30. The process according to claim 28, wherein the aqueous solution of at least one precursor compound of at least one alkaline earth metal oxide and of palladium further comprises at least one precursor compound of platinum.

31. The process according to claim 28, wherein a solution of precursor compounds of cerium oxide and zirconium oxide is further added to the dispersion of step a).

32. An exhaust gas treatment catalyst for an internal combustion engine, made by a process comprising:
 a) preparing a first aqueous coating dispersion intended for a first layer by dispersing into water a particulate aluminum oxide, optionally stabilized, and at least one particulate oxygen storage material selected from the group consisting of cerium oxide, cerium/zirconium mixed oxides and zirconium/cerium mixed oxides, and adding to the first aqueous coating dispersion an aqueous solution of at least one precursor compound of at least one alkaline earth metal oxide;
 b) coating a support structure with the first aqueous coating dispersion to form a coated carrier, followed by drying and calcining the coated carrier, to form the first layer;
 c) impregnating the first layer with an aqueous solution of at least one precursor compound of palladium, followed by drying and calcining the first layer, so that the palladium in the first layer is in close contact with all constituents of the first layer,
 d) preparing a second aqueous coating dispersion intended for a second layer by dispersing into water a member selected from the group consisting of:
  only a portion of a particulate aluminum oxide intended for the second layer, and
  a particulate oxygen storage material intended for the second layer, the particulate oxygen storage material intended for the second layer being selected from the group consisting of cerium oxide, cerium/zirconium mixed oxides, zirconium/cerium mixed oxides and mixtures thereof;
 e) adding to the second aqueous coating dispersion an aqueous solution of at least one precursor compound of rhodium and optionally of platinum;
 f) after a soaking time of at least 30 minutes, completing the coating dispersion for the second layer by dispersing into the aqueous dispersion from step e) either (i) all of the particulate aluminum oxide intended for the second layer, if the particulate oxygen storage material was dispersed into the water during step d), or (ii) the remaining portion of the particulate aluminum oxide intended for the second layer, and the particulate oxygen storage material, if only a portion of the particulate aluminum oxide intended for the second layer was not added in step d); and,
 g) coating the support structure having the first layer thereon with the coating dispersion from step f), followed by drying and calcining, such that the second layer comprises the particulate aluminum oxide, the particulate oxygen storage material, the rhodium, and optionally the platinum.

33. The process according to claim 32, wherein the resulting alkaline earth metal oxide of the first layer comprises barium oxide.

34. The process according to claim 32, wherein the aqueous solution of at least one precursor compound of at least one alkaline earth metal oxide and of palladium further comprises at least one precursor compound of platinum.

35. The process according to claim 32, wherein a solution of precursor compounds of cerium oxide and zirconium oxide is further added to the dispersion of step a).

36. An exhaust gas treatment catalyst for an internal combustion engine, made by a process comprising:
 a) preparing a first aqueous coating dispersion intended for a first layer by dispersing into water a particulate aluminum oxide and at least one particulate oxygen storage material selected from the group consisting of cerium oxide, cerium/zirconium mixed oxides and zirconium/cerium mixed oxides, and adding an aqueous solution of at least one precursor compound of at least one alkaline earth metal oxide, and of palladium;
 b) coating a carrier structure with the first aqueous dispersion to form a coated carrier, followed by drying and calcining the coated carrier, to form a first layer, so that the palladium in the first layer is in close contact with all constituents of the first layer;
 c) preparing a second aqueous coating dispersion intended for a second layer by dispersing into water a member selected from the group consisting of:
  only a portion of a particulate aluminum oxide intended for the second layer, and
  a particulate oxygen storage material intended for the second layer, the particulate oxygen storage material being selected from the group consisting of cerium oxide, cerium/zirconium mixed oxides, zirconium/cerium mixed oxides and mixtures thereof;
 d) adding an aqueous solution of at least one precursor compound of rhodium, and optionally of platinum, to the second aqueous dispersion from step c);
 e) after a soaking time of at least 30 minutes, completing the second aqueous coating dispersion for the second layer by dispersing into the aqueous dispersion from step e) either (i) all of the particulate aluminum oxide intended for the second layer, if the particulate oxygen storage material was dispersed into the water during step d), or (ii) the remaining portion of the particulate aluminum oxide intended for the second layer, and the particulate oxygen storage material, if only a portion of the particulate aluminum oxide intended for the second layer was not added in step d); and,
 f) coating the support structure already provided with the first layer with the coating dispersion from step e), followed by drying and calcining, such that the second layer comprises the particulate aluminum oxide, the particulate oxygen storage material, the rhodium, and optionally the platinum.

37. The process according to claim 36, wherein the resulting alkaline earth metal oxide of the first layer comprises barium oxide.

38. The process according to claim 36, wherein the aqueous solution of at least one precursor compound of at least one alkaline earth metal oxide and of palladium further comprises at least one precursor compound of platinum.

39. The process according to claim 36, wherein a solution of precursor compounds of cerium oxide and zirconium oxide is further added to the dispersion of step a).

40. An exhaust gas treatment catalyst for an internal combustion engine, made by a process comprising:
 a) impregnating a particulate aluminum oxide, optionally stabilized, intended for a first layer, with precursor compounds of cerium oxide, zirconium oxide and an alkaline earth metal oxide, followed by drying and calcining;

b) preparing a first aqueous coating dispersion intended for the first layer by dispersing the impregnated materials from step a) into water;

c) coating a carrier structure with the first aqueous coating dispersion to form a coated carrier, followed by drying and calcining the coated carrier, to form the first layer;

d) impregnating the first layer on the carrier structure with an aqueous solution of precursor compounds of palladium, followed by drying and calcining the first layer, so that the palladium in the first layer is in close contact with all constituents of the first layer;

e) preparing a second aqueous coating dispersion intended for a second layer by dispersing into water a member selected from the group consisting of:
  only a portion of a particulate aluminum oxide intended for the second layer, and
  a particulate oxygen storage material intended for the second layer, the particulate oxygen storage material being selected from the group consisting of cerium oxide, cerium/zirconium mixed oxides, zirconium/cerium mixed oxides and mixtures thereof;

f) adding an aqueous solution of at least one precursor compound of rhodium, and optionally of platinum, to the aqueous dispersion from step e);

g) after a soaking time of at least 30 minutes, completing the second aqueous coating dispersion for the second layer by dispersing into the aqueous dispersion from step f) either (i) all of the particulate aluminum oxide intended for the second layer, if the particulate oxygen storage material was dispersed into the water during step d), or (ii) the remaining portion of the particulate aluminum oxide intended for the second layer, and the particulate oxygen storage material, if only a portion of the particulate aluminum oxide intended for the second layer was not added in step e);

h) coating the support structure already provided with the first layer with the coating dispersion from step g), followed by drying and calcining, such that the second layer comprises the particulate aluminum oxide, the particulate oxygen storage material, the rhodium, and optionally the platinum.

41. The process according to claim 40, wherein the resulting alkaline earth metal oxide of the first layer comprises barium oxide.

42. The process according to claim 40, wherein the aqueous solution of at least one precursor compound of at least one alkaline earth metal oxide and of palladium further comprises at least one precursor compound of platinum.

43. The process according to claim 40, wherein a solution of precursor compounds of cerium oxide and zirconium oxide is further added to the dispersion of step a).

* * * * *